United States Patent
Kimata

(10) Patent No.: US 7,558,350 B2
(45) Date of Patent: Jul. 7, 2009

(54) ADAPTIVE ANTENNA RECEPTION DEVICE HAVING EXCELLENT INITIAL DIRECTIONAL BEAM RECEPTION QUALITY

(75) Inventor: Masayuki Kimata, Tokyo (JP)

(73) Assignee: NEC Corporation (JP)

( * ) Notice: Subject to any disclaimer, the term of this patent is extended or adjusted under 35 U.S.C. 154(b) by 753 days.

(21) Appl. No.: 10/547,178

(22) PCT Filed: Feb. 6, 2004

(86) PCT No.: PCT/JP2004/001240

§ 371 (c)(1),
(2), (4) Date: Aug. 29, 2005

(87) PCT Pub. No.: WO2004/079945

PCT Pub. Date: Sep. 16, 2004

(65) Prior Publication Data

US 2006/0187118 A1    Aug. 24, 2006

(30) Foreign Application Priority Data

Mar. 4, 2003   (JP)   ............................ 2003-057100

(51) Int. Cl.
*H04L 1/02* (2006.01)
*H04B 1/00* (2006.01)

(52) U.S. Cl. ...................... 375/347; 375/349

(58) Field of Classification Search ................ 375/130, 375/260, 267, 285, 343, 346–347, 349; 455/132–135
See application file for complete search history.

(56) References Cited

U.S. PATENT DOCUMENTS 6,501,943 B1 * 12/2002 Ide et al. ..................... 455/101
6,519,477 B1 * 2/2003 Baier et al. ............... 455/67.11
6,670,919 B2 * 12/2003 Yoshida ...................... 342/378
6,882,681 B2 * 4/2005 Sano .......................... 375/148

(Continued)

FOREIGN PATENT DOCUMENTS

JP   H11-274976   10/1999

(Continued)

*Primary Examiner*—Khanh C Tran
(74) *Attorney, Agent, or Firm*—Dickstein, Shapiro, LLP.

(57) ABSTRACT

An adaptive antenna reception device is disclosed in which a directional beam having excellent reception characteristics can be quickly and easily obtained from the start by selecting an initial beam direction of signal processors that are to begin determination of weight that uses time averaging based on the reception quality and the arrival direction in which the reliability is high for an incoming wave that is received in each signal processor in which sufficient averaging time has been secured. An arrival direction detection unit detects the arrival direction of an incoming wave that is received in each signal processor from weight that is determined by each signal processor in which at least a prescribed time interval has been secured for the averaging time for finding a time average. A SIR measurement unit finds the reception quality of a signal of an incoming wave that is received by weighting and synthesizing in each signal processor in which at least a prescribed time interval has been secured for the averaging time. An information collection/selection processor, based on each arrival direction and each reception quality in each signal processor in which at least a prescribed time interval has been secured for the averaging time, selects the initial beam direction in signal processors that are to begin determination of weight using time averaging.

22 Claims, 11 Drawing Sheets

U.S. PATENT DOCUMENTS

| | | |
|---|---|---|
| 7,027,421 B2 * 4/2006 | Park et al. | 370/335 |
| 7,117,016 B2 * 10/2006 | Kisigami et al. | 455/562.1 |
| 2001/0049295 A1 * 12/2001 | Matsuoka et al. | 455/562 |
| 2002/0061051 A1 * 5/2002 | Kitahara | 375/144 |

FOREIGN PATENT DOCUMENTS

| | | |
|---|---|---|
| JP | H11-298345 | 10/1999 |
| JP | 2000-349696 | 12/2000 |
| JP | 2002-077011 | 3/2002 |
| JP | 2002-151937 | 5/2002 |
| JP | 2002-237766 | 8/2002 |
| JP | 2002-335233 | 11/2002 |

* cited by examiner

| weight table | |
|---|---|
| beam 1 | weight of beam 1 |
| beam 2 | weight of beam 2 |
| ⋮ | ⋮ |
| beam m | weight of beam m |
| ⋮ | ⋮ |
| beam M | weight of beam M |

ADAPTIVE ANTENNA RECEPTION DEVICE HAVING EXCELLENT INITIAL DIRECTIONAL BEAM RECEPTION QUALITY

TECHNICAL FIELD

The present invention relates to an adaptive antenna reception method for weighting each of the antennas that make up an adaptive antenna to receive a signal with superior characteristics, and to a device that uses such a method.

BACKGROUND ART

In a mobile communication system according to the CDMA (Code Division Multiple Access) method, a radio base station simultaneously receives user signals from a plurality of mobile stations, and signals of other users therefore interfere with the signal of a particular user. An adaptive antenna is used to receive a desired user signal at a higher gain.

An adaptive antenna is composed of a plurality of antennas and controls amplitude and phase in accordance with a complex number weight that is conferred to the signals that are received by each of the antennas to form directivity. An adaptive antenna is thus capable of suppressing other user signals that constitute interference and of effectively receiving a desired user signal.

Two methods are typically used for determining the weight that is conferred to each antenna of an adaptive antenna.

In one method, weighting is determined by performing feedback control using an algorithm that follows the MMSE (Minimum Mean Square Error) standard. An adaptive updating algorithm such as an RLS (Recursive Least Square) algorithm of the sequential weight updating type or a representative LMS (Least Mean Square) algorithm is used.

In contrast, the other method is the open-loop control method that is the object of the present invention. According to this method, an arrival direction estimation algorithm such as a MUSIC (MUltiple Signal Classification) algorithm or an ESPRIT (Estimation of Signal Parameters via Rotational Invariance Techniques) algorithm is used to estimate the arrival direction of a desired wave based on the signals received in antennas, and the weight of each antenna is then determined in accordance with this direction. A method of determining weight by open-loop control is disclosed in, for example, JP 11-274976-A.

FIG. 1 is a block diagram showing an example of the configuration of an adaptive antenna reception device of the prior art that is described in JP 11-274976-A. In the adaptive antenna reception device that is shown in FIG. 1, N is the number of antennas that make up the adaptive antenna (where N is an integer equal to or greater than 2), and L is the number of synthesized multi-paths (where L is a natural number). FIG. 1 shows the circuit portion for receiving the user signal that is received from the mobile station of the $k^{th}$ user (where k is a natural number).

Referring to FIG. 1, the adaptive antenna reception device includes: antennas $1_1$-$1_N$, signal processors $2_1$-$2_L$, adder 11, determiner 12, and searcher 16. Fingers that correspond to each of the multi-paths that undergo rake synthesis are assigned to signal processors $2_1$-$2_L$.

Signal processor $2_1$ includes: delay unit $3_1$, despreading circuits $4_{11}$-$4_{1N}$, weighting/synthesizing circuit $5_1$, weight calculation unit $6_1$, transmission path estimation circuit $7_1$, complex conjugate circuit $8_1$, initial weight generation unit $9_1$, and multiplier $10_1$. In addition, weight calculation unit $6_1$ includes: signal common-mode average calculation unit $13_1$, correlation detection unit $14_1$, and time average calculation unit $15_1$.

Although not shown in the figure, the interiors of signal processors $2_2$-$2_L$ have the same configuration as signal processor $2_1$. For example, signal processor $2_2$ is made up from: delay unit $3_2$, despreading circuits $4_{21}$-$4_{2N}$, weighting/synthesizing circuit $5_2$, weight calculation unit $6_2$, transmission path estimation circuit $7_2$, complex conjugate circuit $8_2$, initial weight generation unit $9_2$, and multiplier $10_2$. In addition, weight calculation unit $6_2$ includes signal common-mode average calculation unit $13_2$, correlation detection unit $14_2$, and time average calculation unit $15_2$.

Searcher 16 uses each of the signals that are received by N antennas $1_1$-$1_N$ to detect the delay time of L multi-paths. Searcher 16 then reports the timing information of the delay times that are used in each finger to delay units $3_1$-$3_L$, weight calculation units $6_1$-$6_L$, and initial weight generation units $9_1$-$9_L$ of signal processors $2_1$-$2_L$ that constitute each finger of rake synthesis. The N antennas $1_1$-$1_N$ are arranged in proximity so as to have a high level of correlation with each other, and as a result, the delay profiles of N antennas $1_1$-$1_N$ can be considered to be identical. Accordingly, the timing information of the delay time of each multi-path can be used in common for all of antennas $1_1$-$1_N$.

Delay unit $3_1$ delays each of the signals that are received by antennas $1_1$-$1_N$ in accordance with the timing information that has been reported from searcher 16 and sends the signals to despreading circuits $4_{11}$-$4_{1N}$. Delay units $3_2$-$3_L$ similarly delay each of the signals that have been received by antennas $1_1$-$1_N$ in accordance with the timing information that has been reported from searcher 16. In this way, signal processors $2_1$-$2_L$ can each be placed in correspondence with the L multi-paths.

Despreading circuits $4_{11}$-$4_{1N}$ perform despreading of each of the received signals that have been delayed by delay unit $3_1$ and send the results to weighting/synthesizing circuit $5_1$, weight calculation unit $6_1$, and initial weight generation unit $9_1$.

Initial weight generation unit $9_1$ generates an initial weight for use when weight of sufficient accuracy cannot be obtained by weight calculation unit $6_1$ and sends the result to weighting/synthesizing circuit $5_1$.

Initial weight generation unit $9_1$ is used when searcher 16 newly assigns a finger to signal processor $2_1$, or when sufficient averaging time cannot be secured in weight calculation unit $6_1$ of signal processor $2_1$ to which a finger has been assigned. Averaging time is the time that is used for finding the average for the variation value that is the object of averaging. The average value in the averaging time of the variation value is found by averaging in the averaging time. In addition, initial weight generation unit $9_1$ is also used when the path timing of a finger that is in use undergoes a large change.

FIG. 2 is a block diagram showing the configuration of weighting/synthesizing circuit $5_1$. Weighting/synthesizing circuit $5_1$ includes: multipliers $17_1$-$17_N$, adder 18, and complex conjugate circuits $19_1$-$19_N$.

Complex conjugate circuits $19_1$-$19_N$ of weighting/synthesizing circuit $5_1$ generate a complex conjugate of the weight that is generated by weight calculation unit $6_1$ or by initial weight generation unit $9_1$ and send this complex conjugate to multipliers $17_1$-$17_N$.

Each of multipliers $17_1$-$17_N$ multiplies received signals that have undergone despreading by despreading circuits $4_{11}$-$4_{1N}$ with the complex conjugates of weights that have been generated by complex conjugate circuits $19_1$-$19_N$ that correspond to the signals and sends the results to adder 18.

Adder 18 synthesizes the outputs of multipliers $17_1$-$17_N$ and sends the results to transmission path estimation circuit $7_1$ and multiplier $10_1$ that are shown in FIG. 1.

Signal common-mode average calculation unit $13_1$ of weight calculation unit $6_1$ adds vectors of the symbols of each signal that has undergone despreading by despreading circuits $4_{11}$-$4_{1N}$ during the matching phase, finds the average values of signals for each antenna, and sends the results to correlation detection unit $14_1$. At this time, any number of symbols may undergo vector addition, and any weight can be applied to each symbol.

Correlation detection unit $14_1$ uses the average value of each signal from signal common-mode average calculation unit $13_1$ to find correlation between the received signal at the antenna that is the standard and received signals at other antennas. For this purpose, correlation detection unit $14_1$ multiples the complex conjugate of the average value of the signal that corresponds to the reference antenna by the average values of signals for other antennas and sends the correlations that are the results of each multiplication to time average calculation unit $15_1$.

Time average calculation unit $15_1$ takes the mean in a prescribed time interval for each multiplication result from correlation detection unit $14_1$, finds the weight for each of antennas $1_1$-$1_N$, and sends the results to weighting/synthesizing circuit $5_1$. There are a variety of weight methods and time intervals for taking the mean in time average calculation unit $15_1$, and the method and time interval can be freely selected.

In this way, weighting/synthesizing circuit $5_1$ uses the weight that has been generated in weight calculation unit $6_1$ to control and synthesize the amplitude and phase of the signals received by antennas $1_1$-$1_N$ and form the directivity by which a desired user signal can be received at high gain.

Transmission path estimation circuit $7_1$ estimates the transmission path distortion based on the output signal of weighting/synthesizing circuit $5_1$ and sends the result to complex conjugate circuit $8_1$.

Complex conjugate circuit $8_1$ generates a complex conjugate of the transmission path distortion that has been estimated by transmission path estimation circuit $7_1$.

Multiplier $10_1$ multiplies the complex conjugate of the transmission path distortion that has been generated by complex conjugate circuit $8_1$ by the output signal of weighting/synthesizing circuit $5_1$ to compensate the transmission path distortion.

Signals in which the transmission path distortion from each finger has been compensated are similarly obtained by signal processors $2_1$-$2_L$.

Adder 11 performs rake synthesis by adding the output signals of signal processors $2_1$-$2_L$ and sends the synthesized output signal to determiner 12.

Determiner 12 determines each symbol and supplies the reception symbol of $k^{th}$ user as output.

FIG. 3 is a flow chart showing the operation when assigning fingers in the adaptive antenna reception device that is shown in FIG. 1. Referring to FIG. 3, signal processors $2_1$-$2_L$ first determine whether an assigned finger is a new finger or not (Step C1).

If the assigned finger is a new finger, signal processors $2_1$-$2_L$ use the initial weight that has been generated by initial weight generation units $9_1$-$9_L$ in weighting/synthesizing circuits $5_1$-$5_L$ (Step C4).

If the assigned finger is not a new finger, signal processors $2_1$-$2_L$ determine whether sufficient averaging time has been secured in signal common-mode average calculation units $13_1$-$13_L$ and time average calculation units $15_1$-$15_L$ of weight calculation units $6_1$-$6_L$ (Step C2).

If sufficient averaging time of weight calculation units $6_1$-$6_L$ has not been secured, signal processors $2_1$-$2_L$ use the initial weight that has been generated in initial weight generation units $9_1$-$9_L$ in weighting/synthesizing circuits $5_1$-$5_L$ (Step C4). On the other hand, if sufficient averaging time of weight calculation units $6_1$-$6_L$ has been secured, signal processors $2_1$-$2_L$ use the weight that was generated in time average calculation units $15_1$-$15_L$ in weighting/synthesizing circuits $5_1$-$5_L$ (Step C3).

FIG. 4 is a flow chart showing the operations at the time of change of path timing of a finger in the adaptive antenna reception device that is shown in FIG. 1. Referring to FIG. 4, signal processors $2_1$-$2_L$ first determine whether the path timing of a finger has changed by $x_T$ chips or more (Step D1). The value $x_T$ is the threshold value for the amount of change in path timing, and determines whether the rate of change in path timing is at a level that cannot be followed by the weights that are calculated by weight calculation units $6_1$-$6_L$.

When the path timing of a finger equals or exceeds $x_T$ chips, signal processors $2_1$-$2_L$ use the initial weights that are generated by initial weight generation units $9_1$-$9_L$ in weighting/synthesizing circuits $5_1$-$5_L$ (Step D4). When the change in path timing of a finger falls short of $x_T$ chips, signal processors $2_1$-$2_L$ determine whether sufficient averaging time has been secured in signal common-mode average calculation units $13_1$-$13_L$ and in time average calculation units $15_1$-$15_L$ of weight calculation units $6_1$-$6_L$ (Step D2).

If the averaging time of weight calculation units $6_1$-$6_L$ is not sufficient, signal processors $2_1$-$2_L$ use the initial weights of the finger that have been generated by initial weight generation units $9_1$-$9_L$ in weighting/synthesizing circuits $5_1$-$5_L$ (Step D4). On the other hand, if sufficient averaging time of weight calculation units $6_1$-$6_L$ has been secured, signal processors $2_1$-$2_L$ use the weights of the finger that have been generated in time average calculation units $15_1$-$15_L$ of weight calculation units $6_1$-$6_L$ in weighting/synthesizing circuits $5_1$-$5_L$ (Step D3).

Generally, two methods are used in adaptive antennas for determining the initial weight.

One method takes into consideration the point that the arrival direction of a user signal differs due to reception conditions, and takes as the initial weight a value such as a non-directional weight that allows reception regardless of the reception conditions in order to enable reception of the user signal under any conditions.

The other method is a method of estimating the initial weight based on signals that are received by a plurality of antennas $1_1$-$1_N$ (refer to JP 2002-77011-A). In this method, the transmission path is estimated based on, for example, the received signals from each antenna, and the thus-obtained weight is taken as the initial weight.

The above-described methods of the prior art have the following problems:

When a non-directional weight is taken as the initial weight, gain is the same for all directions, and as a result, a beam cannot be directed in the arrival direction of a desired user signal.

Using signals that are received by a plurality of antennas $1_1$-$1_N$ to estimate the transmission path and then using the thus-obtained weight as the initial weight complicates highly accurate estimation of the transmission path in a short time interval, and therefore prevents direction of a beam in the arrival direction of a desired user signal.

As a result, when the path timing of a finger changes greatly at the time a finger is newly assigned, or when sufficient averaging time cannot be secured in weight calculation units $6_1$-$6_L$, there is a potential for degradation of the reception characteristics of the user signal.

Using signals that are obtained by a plurality of antennas $1_1$-$1_N$ to estimate the transmission path and then using the thus-obtained weight as the initial weight, not only entails a large amount of calculation for estimating the transmission path, but also increases the burden placed on signal processors $2_1$-$2_L$ and demands a high level of processing capability.

DISCLOSURE OF THE INVENTION

It is an object of the present invention to provide an open-loop controlled adaptive antenna reception device that is capable of finding, in a short time interval, and moreover, with few computations, an initial weight that allows reception of a user signal with superior reception characteristics.

In an adaptive antenna reception device according to the present invention that can achieve the above-described object: a signal processor is assigned for at least one incoming wave, and in each signal processor, signals that are received by a plurality of antennas are weighted by weights of each antenna that are determined by using a time average of a calculated value that is obtained by a prescribed computation from received signals by the plurality of antennas and then synthesized to further synthesize a plurality of incoming waves that have been received by the plurality of signal processors to obtain a desired signal.

In the adaptive antenna reception device of the present invention, a weight is determined by each signal processor in which at least a prescribed time interval is secured for the averaging time to find a time average, and based on these weights that have been determined, an arrival direction detection unit detects the arrival direction of an incoming wave that has been received by these signal processors. A reception quality acquisition unit then finds the reception quality of the signal of the incoming wave that has been received by weighting and synthesizing by each signal processor in which at least a prescribed time interval has been secured for the averaging time. An information collection/selection processor then, based on each arrival direction and the reception quality of each arrival direction in each signal processor in which at least a prescribed time interval has been secured for the averaging time, selects an initial beam direction in signal processors that are to begin determination of weight using time averaging.

Accordingly, the present invention, the initial beam direction of signal processors that are to begin determination of weight using a time average can be selected based on the reception quality and the arrival direction of a high reliable incoming wave that is received at each signal processor in which a sufficient averaging time has been secured. As a result, a directional beam having excellent reception characteristics can be quickly and easily obtained from the start.

In addition, the information collection/selection processor may select, from among a plurality of predetermined beam directions, the beam direction that is closest to an arrival direction that has been detected by, among signal processors in which at least a prescribed time interval has been secured for the averaging time, the signal processor in which the best reception quality has been obtained.

Accordingly, a plurality of beam directions that can be selected as the initial beam direction can be determined in advance as a table, and the beam direction that is closest to the arrival direction of the incoming wave having the best reception quality among each of incoming waves for which highly reliable reception quality has been measured and for which a sufficient averaging time has been secured can be selected from among this plurality of beam directions. As a result, from the start a directional beam having excellent reception quality can be obtained in a short time interval and with little processing.

In addition, an initial weight generation unit may form a directional beam in the initial beam direction that has been selected by the information collection/selection processor and may find an initial weight that is used in weighting and synthesizing until an averaging time of at least a prescribed time interval has been secured in signal processors.

Accordingly, in signal processors that are to begin determination of weight that uses time averaging, a beam direction weight that is acquired quickly and easily can be used until sufficient averaging time has been secured, and after the averaging time has become sufficient, a highly accurate weight that is obtained by time averaging can be used. As a result, the appropriate method of determining beam direction can be selected according to the current conditions both before and after sufficient averaging time has been secured, and a directional beam having good reception characteristics can always be obtained.

BEST MODE FOR CARRYING OUT THE INVENTION

The following explanation regards the details of embodiments of the present invention with reference to the accompanying figures.

Figure 5:
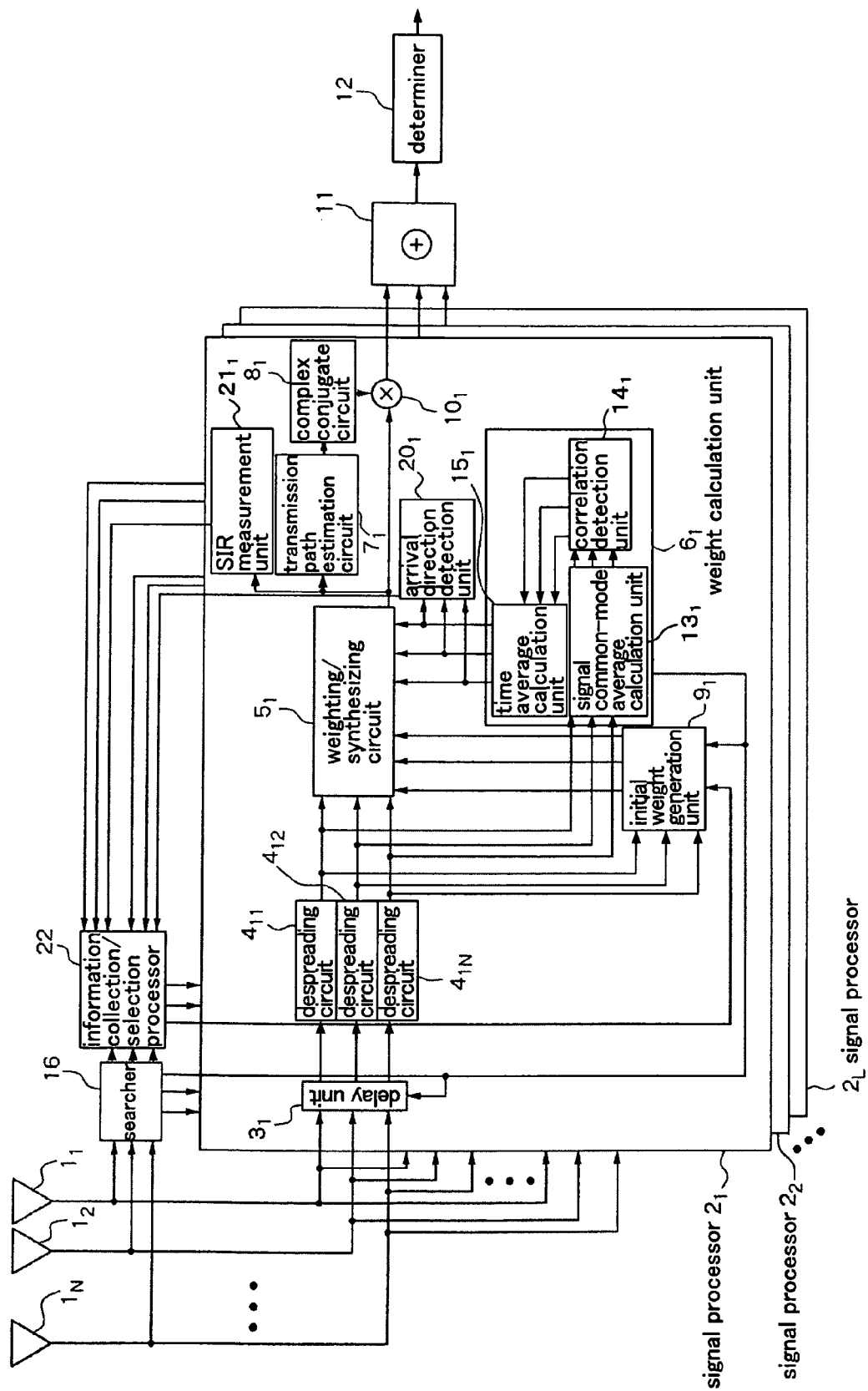
FIG. 5 is a block diagram showing an example of the configuration of an open-loop controlled adaptive antenna reception device according to an embodiment of the present invention.

FIG. 5 is a block diagram showing an example of the configuration of an open-loop controlled adaptive antenna reception device according to the present embodiment. In the adaptive antenna reception device of the present embodiment that is shown in FIG. 5, the number of antennas that make up the adaptive antenna is N (where N is an integer equal to or greater than 2) and the number of synthesized multi-paths is L (where L is a natural number). FIG. 5 shows the circuit portion for receiving the user signal that is received from the mobile station of the $k^{th}$ user (where k is a natural number).

Referring to FIG. 5, the adaptive antenna reception device includes: antennas $1_1$-$1_N$, signal processors $2_1$-$2_L$, adder 11, determiner 12, searcher 16, and information collection/selection processor 22.

Signal processor $2_1$ includes: delay unit $3_1$, despreading circuits $4_{11}$-$4_{1N}$, weighting/synthesizing circuit $5_1$, weight calculation unit $6_1$, transmission path estimation circuit $7_1$, complex conjugate circuit $8_1$, initial weight generation unit $9_1$, multiplier $10_1$, arrival direction detection unit $20_1$, and SIR measurement unit $21_1$. In addition, weight calculation unit $6_1$ includes: signal common-mode average calculation unit $13_1$, correlation detection unit $14_1$, and time average calculation unit $15_1$.

Although not shown in the figure, the interiors of signal processors $2_2$-$2_L$ have the same configuration as signal processor $2_1$. For example, signal processor $2_2$ includes: delay unit $3_2$, despreading circuits $4_{21}$-$4_{2N}$, weighting/synthesizing circuit $5_2$, weight calculation unit $6_2$, transmission path estimation circuit $7_2$, complex conjugate circuit $8_2$, initial weight generation unit $9_2$, multiplier $10_2$, arrival direction detection unit $20_2$, and SIR measurement unit $21_2$. Weight calculation unit $6_2$ further includes signal common-mode average calculation unit $13_2$, correlation detection unit $14_2$, and time average calculation unit $15_2$.

Searcher 16 uses each of the signals that are received at N antennas $1_1$-$1_N$ to detect the delay times of L multi-paths. These delay times are shown by, for example, the chip number. Searcher 16 then reports to each of delay units $3_1$-$3_L$, weight calculation units $6_1$-$6_L$ and initial weight generation units $9_1$-$9_L$ of signal processors $2_1$-$2_L$ the timing information of the delay times that are used in each of these components. In addition, searcher 16 also reports the timing information of the delay times, that have been reported to all signal processors $2_1$-$2_L$, to information collection/selection processor 22.

The assignment of fingers to signal processors $2_1$-$2_L$ refers to the operations by which searcher 16 reports the timing information of the delay time of each multi-path to delay units $3_1$-$3_L$, weight calculation units $6_1$-$6_L$, and initial weight generation units $9_1$-$9_L$ of each of signal processors $2_1$-$2_L$ and starts signal processing operations.

In addition, the N antennas $1_1$-$1_N$ are arranged in proximity so as to have high mutual correlation. The delay profiles of all N antennas $1_1$-$1_N$ can be considered to be identical. Accordingly, the timing information of the delay times of each multi-path can be used in common regardless of antennas $1_1$-$1_N$.

Delay unit $3_1$ delays each of the signals that have been received at antennas $1_1$-$1_N$ in accordance with the timing information that has been reported from searcher 16 and sends the delayed signals to despreading circuits $4_{11}$-$4_{1N}$. Delay units $3_2$-$3_L$ similarly delay each of the signals that have been received at antennas $1_1$-$1_N$ in accordance with the timing information that has been reported from searcher 16. Each of signal processors $2_1$-$2_L$ is thus placed so as to correspond to the L multi-paths.

Despreading circuits $4_{11}$-$4_{1N}$ subject each of the received signals that have been delayed at delay unit $3_1$ to despreading, and send the results to weighting/synthesizing circuit $5_1$, weight calculation unit $6_1$, and initial weight generation unit $9_1$.

Figure 1:
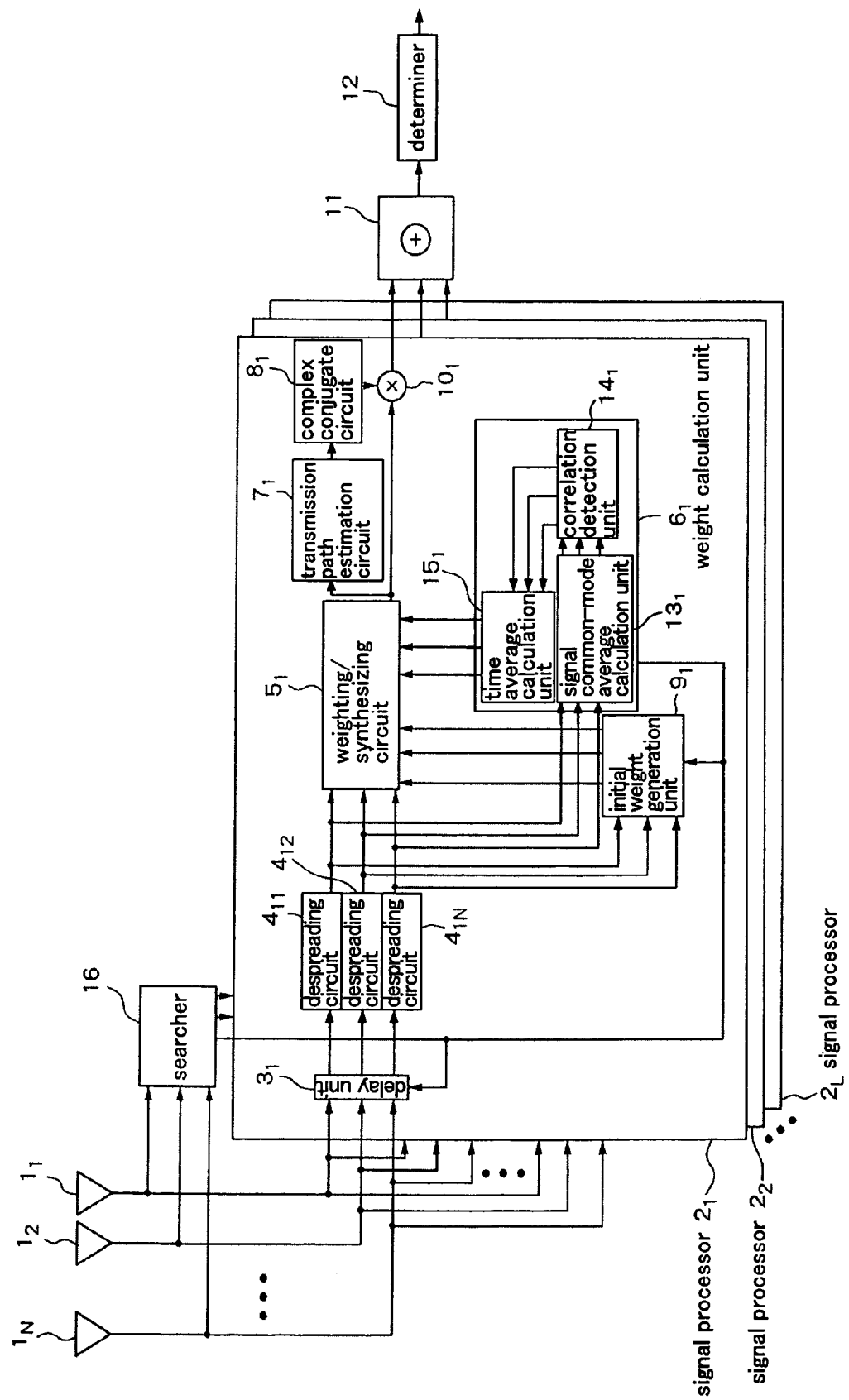
FIG. 1 is a block diagram showing an example of the configuration of an adaptive antenna reception device of the prior art.
Figure 2:
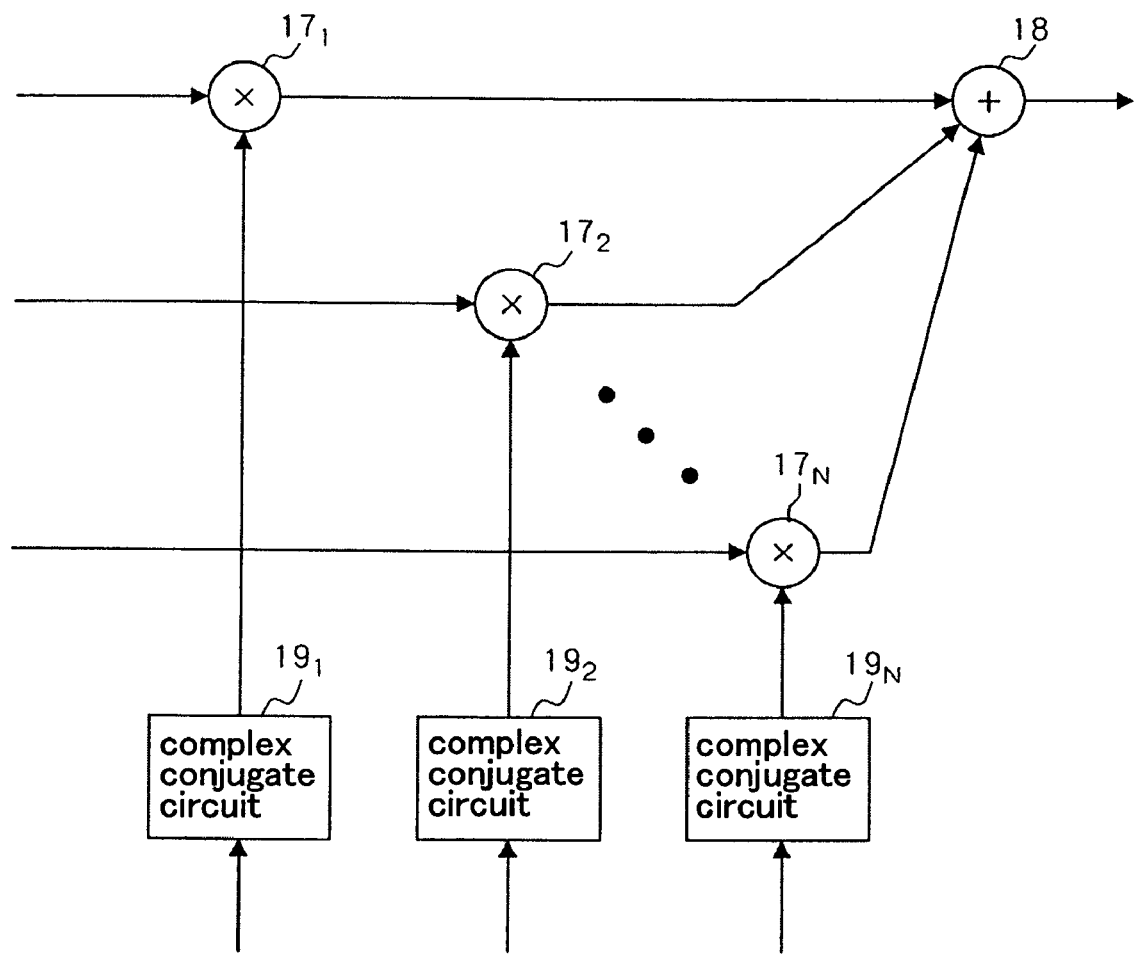
FIG. 2 is a block diagram showing the configuration of a weighting/synthesizing circuit.
Figure 3:
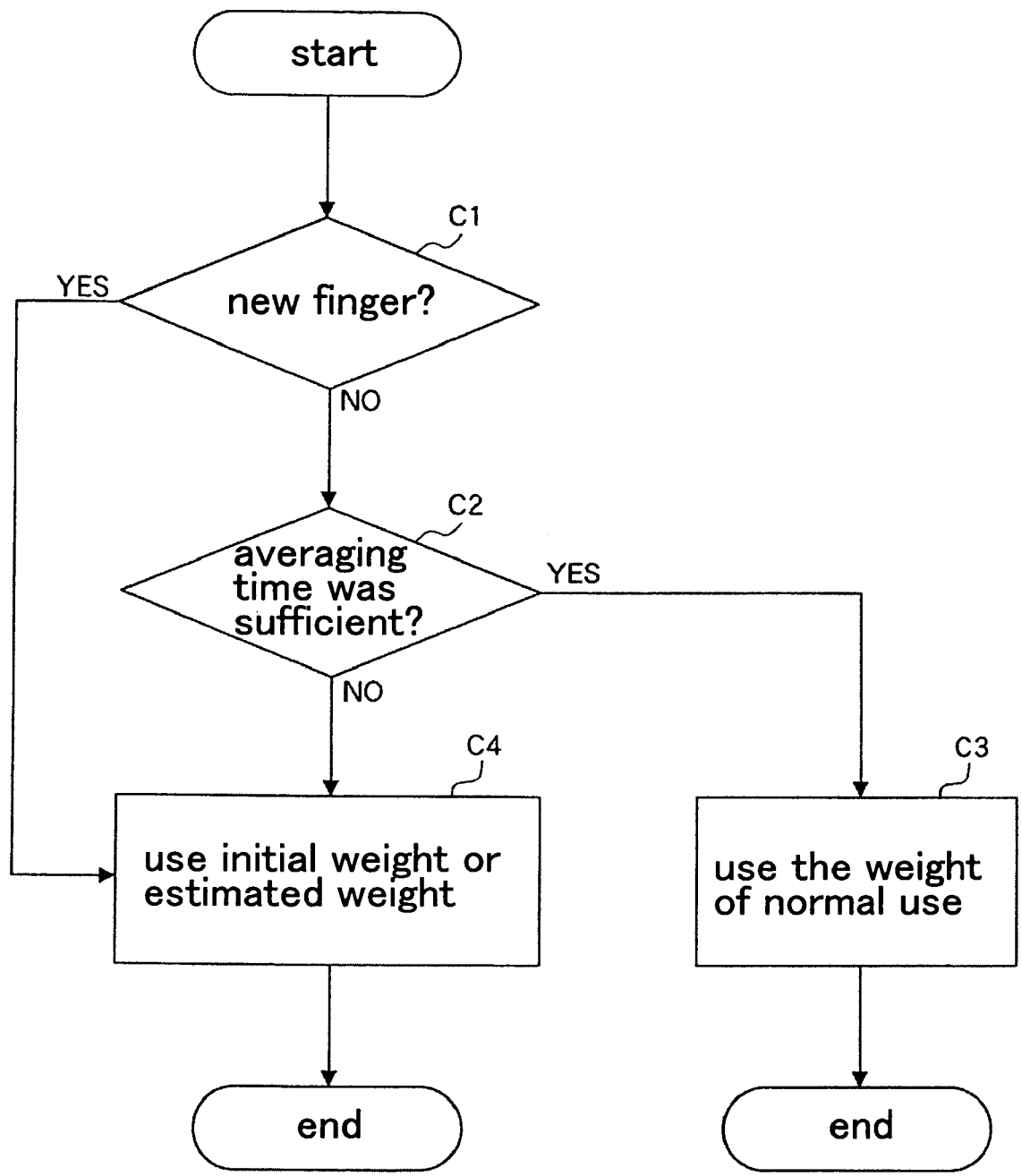
FIG. 3 is a flow chart showing operations when fingers in the adaptive antenna reception device that is shown in FIG. 1 are assigned.
Figure 4:
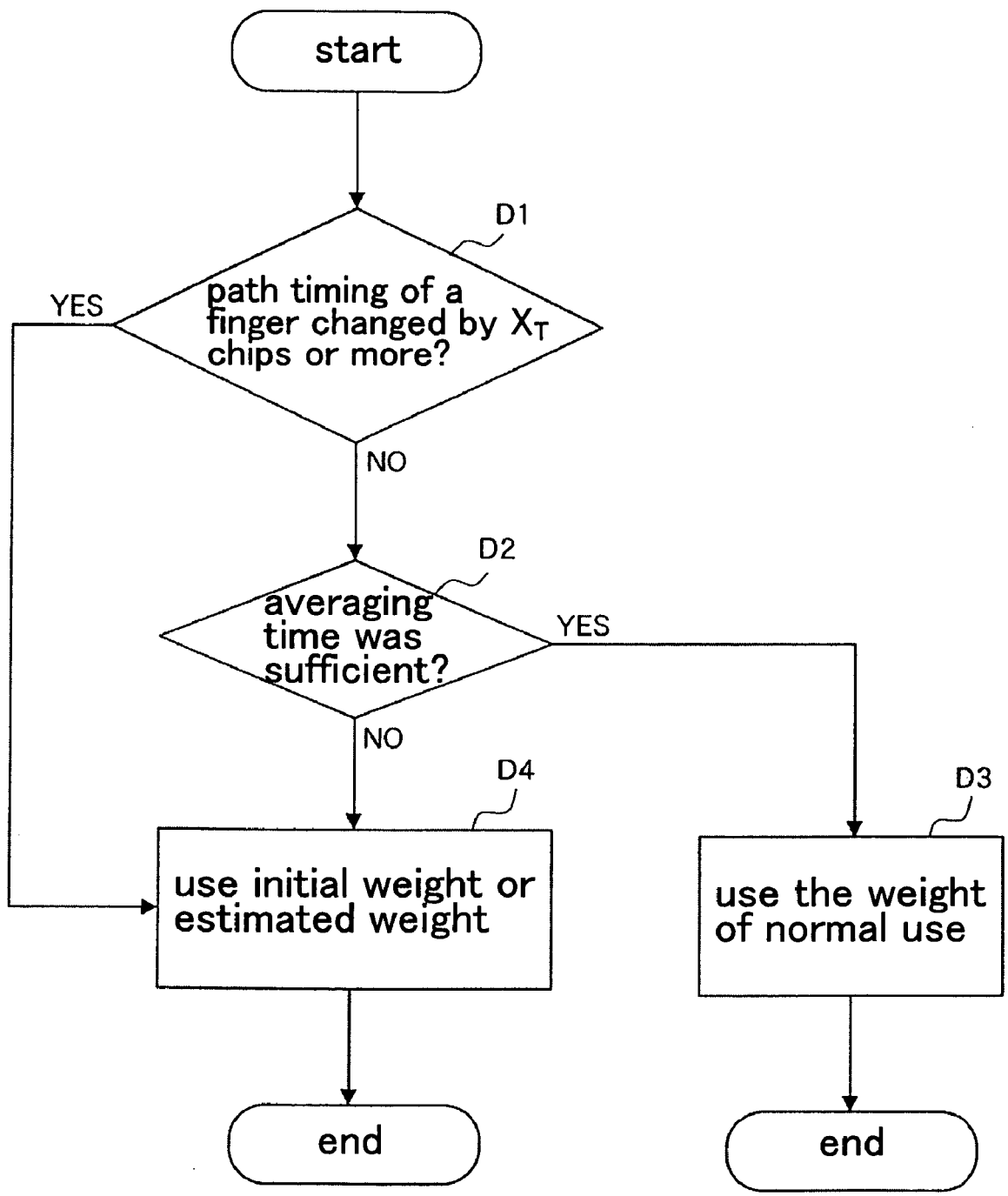
FIG. 4 is a flow chart showing operations when the path timing of a finger has changed in the adaptive antenna reception device that is shown in FIG. 1.

Weighting/synthesizing circuit $5_1$ has the same configuration as the component of the prior art that was shown in FIG. 2. Referring to FIG. 2, weighting/synthesizing circuit $5_1$ includes: multipliers $17_1$-$17_N$, adder 18, and complex conjugate circuit $19_1$-$19_N$.

Complex conjugate circuits $19_1$-$19_N$ of weighting/synthesizing circuit $5_1$ generate each of the complex conjugates of the weights that have been generated by weight calculation unit $6_1$ or initial weight generation unit $9_1$ and send the results to multipliers $17_1$-$17_N$. Each of multipliers $17_1$-$17_N$ multiplies the received signals, that have been subjected to despreading by despreading circuits $4_{11}$-$4_{1N}$, by the corresponding complex conjugates of the weights that have been generated by complex conjugate circuits $19_1$-$19_N$ and sends the products to adder 18. Adder 18 synthesizes the outputs of multipliers $17_1$-$17_N$ and sends the result to transmission path estimation circuit $7_1$, multiplier $10_1$, and SIR measurement unit $21_1$ that are shown in FIG. 5.

As described in the foregoing description, weighting/synthesizing circuit $5_1$ weights and synthesizes the signals from despreading circuits $4_{11}$-$4_{1N}$.

Signal common-mode average calculation unit $13_1$ of weight calculation unit $6_1$ matches the phase of each symbol and performs vector addition (common-mode addition) of the symbols of signals that have undergone despreading by despreading circuits $4_{11}$-$4_{1N}$, finds the average value of the signal for each antenna and sends the results to correlation detection unit $14_1$. At this time, any number of symbols (the number of average symbols) may undergo common-mode addition. In addition, each symbol can be subjected to any weighting. The signal average value that is found by common-mode addition is a signal in which the SINR (Signal-to-Interference plus Noise Ratio: the ratio of the signal power of a desired wave to the signal power of interference waves and thermal noise power) has been improved.

When symbols that have undergone despreading have been subjected to modulation, these symbols cannot be simply subjected to common-mode addition. If a known pilot signal is used in such cases, the elimination of modulation by the pilot symbol enables common-mode addition. The effect of SINR improvement increases as the number of average symbols increases, but when fluctuation in phase is extreme due to, for example, fading, the number of average symbols is limited.

Correlation detection unit $14_1$ uses the average value of each signal from signal common-mode average calculation unit $13_1$ to find the correlation value between the received signal at the antenna that is the reference and the received signals at other antennas. For this purpose, correlation detection unit $14_1$ multiplies the complex conjugate of the average value of the signal, that corresponds to the reference antenna, with the average value of the signals that correspond to other antennas. Correlation detection unit $14_1$ then sends the correlation values that are the results of each multiplication to time average calculation unit $15_1$.

Figure 6:
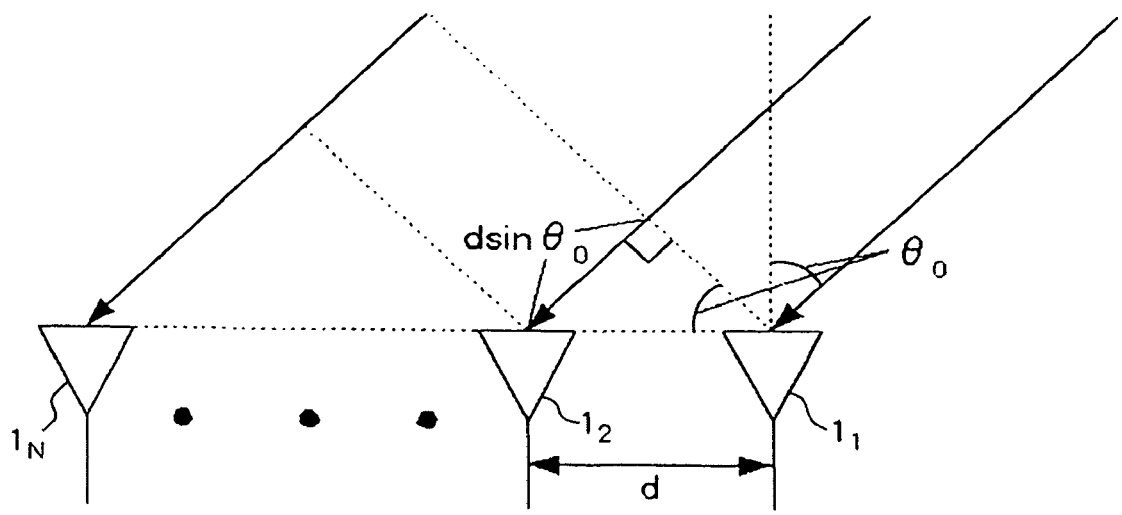
FIG. 6 shows an example of the reception of a signal by an antenna that makes up an adaptive antenna.

FIG. 6 shows an example of the reception of a signal by antennas $1_1$-$1_N$ that make up an adaptive antenna. In this example, antennas $1_1$-$1_N$ are arranged in one row at an equal spacing of element spacing d.

The advance in the phase of a signal that is received by each of antennas $1_1$-$1_N$ differs depending on the arrival direction of the signal. For example, the phase of the signal that is received at antenna $1_1$ is advanced by $(n-1)(2\pi d/\lambda) \sin \theta_0$ compared to the signal that is received at antenna $1_n$ (where n is an integer $2 \leq n \leq N$). In this case, $\theta_0$ is the angle of the arrival direction of the signal with respect to the direction of arrangement of antennas $1_1$-$1_N$. In addition, $\lambda$ is the wavelength of the carrier wave frequency.

Accordingly, if antenna $1_1$ is taken as the reference antenna, $-(n-1)(2\pi d/\lambda) \sin \theta_0$, which is the phase of the signal that is received at the $n^{th}$ antenna $1_n$, is ideally detected as the correlation value by correlation detection unit $14_1$.

Time average calculation unit $15_1$ takes the average of a prescribed time interval for each correlation value that is obtained from correlation detection unit $14_1$ to find the weight for each of antennas $1_1$-$1_N$ and sends this weight to weighting/synthesizing circuit $5_1$ and arrival direction detection unit $20_1$. The time interval for averaging and the weighting method in time average calculation unit $15_1$ can assume a variety of forms, any of which can be selected.

In this way, weighting/synthesizing circuit $5_1$ uses the weight that has been generated by weight calculation unit $6_1$ or the initial weight that is generated by initial weight generation unit $9_1$ to control and synthesize the amplitude and phase of the signal that is received by antennas $1_1$-$1_N$ and thus realize the directivity that allows reception of a desired user signal at high gain.

The weighting for each of antennas $1_1$-$1_N$ operates such that the phases of the received signals of each of antennas $1_1$-$1_N$ for a desired signal that arrives from a direction of angle $\theta_0$ are synthesized by matching the phase of the received signal of antenna $1_1$, which is the reference antenna. For a signal that arrives from a direction that differs from angle $\theta_0$, the phase will not match between antenna $1_1$, which is the reference antenna, and other antennas.

As a result, a beam is formed as the directivity of the array antenna, this beam having high gain in the direction of angle $\theta_0$ but having reduced gain in directions other than angle $\theta_0$.

Transmission path estimation circuit $7_1$ estimates the transmission path distortion based on the output signal of weighting/synthesizing circuit $5_1$ and sends the result to complex conjugate circuit $8_1$.

Complex conjugate circuit $8_1$ generates the complex conjugate of the transmission path distortion that was estimated by transmission path estimation circuit $7_1$.

Multiplier $10_1$ multiplies the complex conjugate of the transmission path distortion, that was generated by complex conjugate circuit $8_1$, by the output signal of weighting/synthesizing circuit $5_1$ to compensate the transmission path distortion.

Signals in which the transmission path distortion has been compensated are similarly obtained from each of the fingers realized by signal processors $2_1$-$2_L$.

Adder $11$ implements rake synthesis by adding the output signals of signal processors $2_1$-$2_L$ and sends the synthesis output signal to determiner $12$.

Determiner $12$ determines each symbol and supplies the received symbols of the $k^{th}$ user as output.

Arrival direction detection units $20_1$-$20_L$ find angle $\theta_0$ of the arrival direction from the weights that have been generated by time average calculation units $15_1$-$15_L$ of weight calculation units $6_1$-$6_L$ and sends the result to information collection/selection processor $22$.

SIR measurement units $21_1$-$21_L$ measure the SIR (Signal to Interference Ratio) that has been averaged over any time interval from the output of weighting/synthesizing circuits $5_1$-$5_L$ and sends the result to information collection/selection processor $22$. The time interval over which this SIR has been averaged (the averaging time) is preferably on the same order as the averaging time that is used in signal common-mode average calculation units $13_1$-$13_L$ and time average calculation units $15_1$-$15_L$ of weight calculation units $6_1$-$6_L$. The averaging time is the time interval that is used for finding the average for the variation value that is the object of averaging. The average value in the averaging time of variation is found by averaging in the averaging time interval.

The timing information of each finger is applied as input from searcher $16$ to information collection/selection processor $22$. In addition, SIR information from SIR measurement units $21_1$-$21_L$ of signal processors $2_1$-$2_L$ for which fingers have already been assigned is further applied as input to information collection/selection processor $22$. Still further, arrival direction information from arrival direction detection units $20_1$-$20_L$ of signal processors $2_1$-$2_L$, for which fingers have already been assigned and in which sufficient averaging time has been secured in weight calculation units $6_1$-$6_L$, is applied as input to information collection/selection processor $22$.

When searcher $16$ newly assigns fingers to signal processors $2_1$-$2_L$, when the path timings of the fingers that have been assigned to signal processors $2_1$-$2_L$ undergo large changes, or when sufficient averaging time has not been secured in signal common-mode average calculation units $13_1$-$13_L$ and time average calculation units $15_1$-$15_L$ of weight calculation units $6_1$-$6_L$ of signal processors $2_1$-$2_L$ for which fingers have already been assigned, information collection/selection processor $22$ reports a beam number that is used in generating initial weights to initial weight generation units $9_1$-$9_L$ of signal processors $2_1$-$2_L$. The beam number that is reported at this time is the beam number of the direction that is closest to the arrival direction of the signal in the finger (among the fingers that have already been assigned to any of signal processors $2_1$-$2_L$) in which sufficient averaging time has been secured in signal common-mode average calculation units $13_1$-$13_L$ and time average calculation units $15_1$-$15_L$ of weight calculation units $6_1$-$6_L$ and for which the greatest SIR has been measured in SIR measurement units $21_1$-$21_L$. In addition, a plurality of beam numbers are determined in advance using multiple beams that are orthogonal or equally spaced with respect to the arrival direction of the signal, and information collection/selection processor $22$ selects from among these beams a beam number that meets the above-described conditions.

Figure 7:
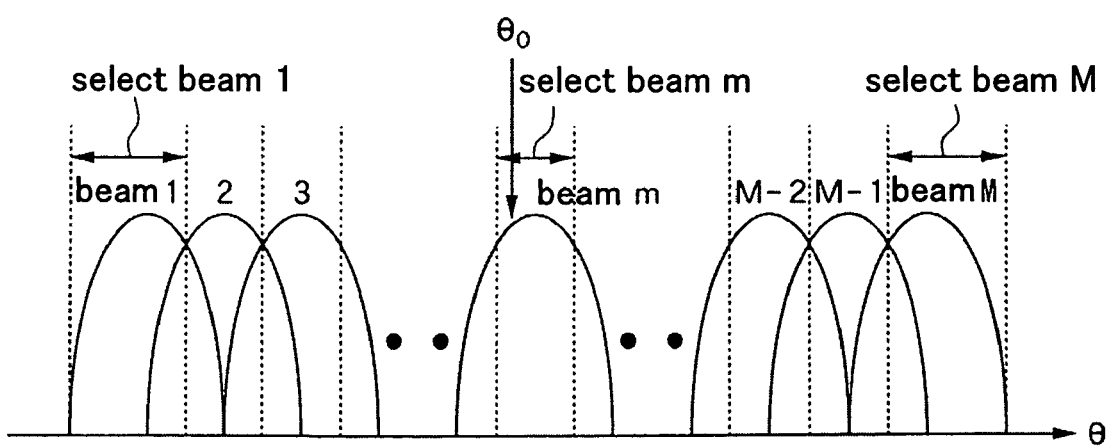
FIG. 7 shows the selection of, from among a plurality of beams that have been determined by an orthogonal multi-beam, a beam that is directed in the direction that is closest to the arrival direction information of the finger in which the maximum SIR has been measured.

FIG. 7 shows the selection, from among a plurality of beams that have been determined by orthogonal multi-beams, of the beam that is directed in the direction that is closest to the arrival direction information of a finger in which the greatest SIR has been measured. In FIG. 7, the horizontal axis is angle $\theta$ that indicates the beam direction, and the vertical axis is the amplitude. FIG. 7 shows the characteristics of a plurality of beams (in this case, M, where M is a natural number) that can be selected as the initial weight.

The directions of each of the orthogonal multi-beams that are shown in FIG. 7 are determined such that the peak direction of a particular beam will be the null direction of other beams. If the arrival direction of the finger for which the maximum SIR is measured is angle $\theta_0$, the beam of beam number m that is in the direction that is closest to this direction will be selected.

Figures 8, 9:
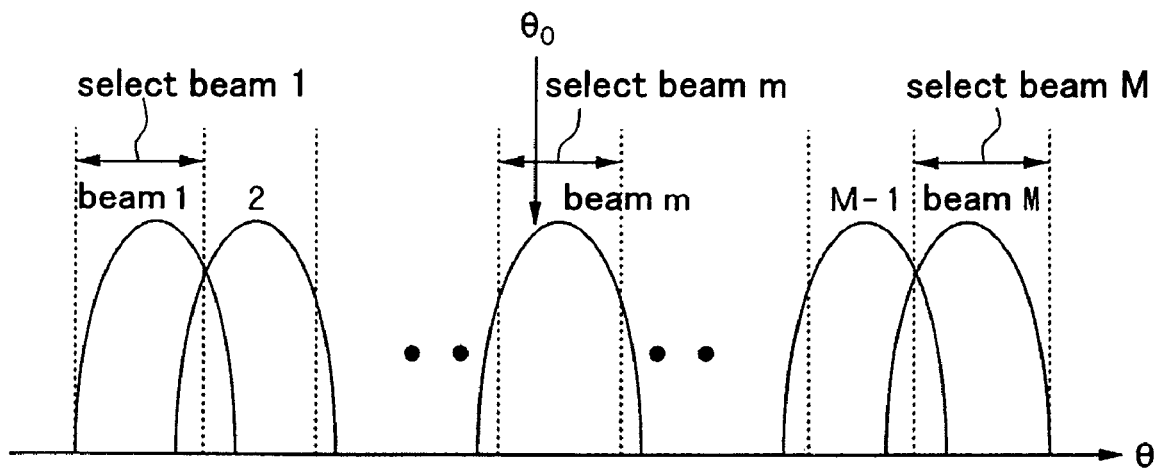
FIG. 8 shows the selection of, from among a plurality of beams that have been determined by equally spaced multi-beams, a beam that is directed in the direction that is closest to the arrival direction information of the finger in which the maximum SIR has been measured.
FIG. 9 is a table showing the weights of orthogonal or equally spaced multi-beams.

FIG. 8 shows the selection, from among a plurality of beams that have been determined by equally spaced multi-beams, of the beam directed in the direction that is closest to the arrival direction information of the finger in which the greatest SIR has been measured. The direction of the equally spaced multi-beams that are shown in FIG. 8 is determined such that the spacing of the beam directions is equal. If the arrival direction of the finger in which the greatest SIR is measured is $\theta_0$, the beam of beam number m that is closest to this direction will be selected, as in FIG. 7.

The arrival direction information of the finger in which the greatest SIR has been measured is used because the reception quality is very likely to be high in the path of that beam direction of that finger. In the macro-cell environment of a mobile communication cellular system, the electric waves that are sent from a mobile station are reflected, diffracted, or scattered by the topography or structures such as buildings in the vicinity of the mobile station and typically arrive at a radio base station by way of a plurality of paths having approximately the same arrival angle. As a result, it is appropriate to use the weight of the beam number of the beam that is closest to the arrival direction information of a finger that has been selected, as described hereinabove, as the initial weight that is generated by initial weight generation units $9_1$-$9_L$, In addition, the arrival direction information of the finger for which the maximum SIR has been measured is not directly used in the generation of the initial weight. This is because it is believed that, in already assigned fingers, the arrival direction information of signal processors $2_1$-$2_L$, in which the maximum SIR has been measured and in which sufficient averaging time has been secured in signal common-mode average calculation units $13_1$-$13_L$ and in time average calculation units $15_1$-$15_L$ of weight calculation units $6_1$-$6_L$, will differ from the signal arrival direction of fingers that have been newly assigned to signal processors $2_1$-$2_L$, fingers in which the timing has undergone large changes, or fingers in which sufficient averaging time has not been secured in weight calculation units $6_1$-$6_L$ of signal processors $2_1$-$2_L$ that have been assigned.

Initial weight generation units $9_1$-$9_L$ generate initial weights that are used when weights of sufficient accuracy cannot be obtained by weight calculation units $6_1$-$6_L$ and send these weights to weighting/synthesizing circuits $5_1$-$5_L$.

Initial weight generation units $9_1$-$9_L$ are used when searcher 16 newly assigns fingers to signal processors $2_1$-$2_L$ and sufficient averaging time has not been secured in weight calculation units $6_1$-$6_L$ of signal processors $2_1$-$2_L$ to which fingers have been assigned. In addition, initial weight generation units $9_1$-$9_L$ are also used when the path timing of fingers that are in use undergo large changes.

FIG. 9 is a table showing the weights of orthogonal or equally spaced multi-beams. This table is used in the determination of weights by initial weight generation units $9_1$-$9_L$.

Referring to FIG. 9, weights are shown that correspond to beam numbers. Initial weight generation units $9_1$-$9_L$ select the weights from the table of FIG. 9 that correspond to beam number m that has been reported by information collection/selection processor 22 and report these weights to weighting/synthesizing circuits $5_1$-$5_L$.

If there are no fingers in which sufficient averaging time has been secured in weight calculation units $6_1$-$6_L$ among fingers that have already been assigned to signal processors $2_1$-$2_L$, initial weight generation units $9_1$-$9_L$ use a prescribed weight such as a nondirectional weight or an estimated weight that is found by transmission path estimation. A prescribed weight such as a nondirectional weight or an estimated weight that is found by transmission path estimation is referred to below as a second initial weight.

Figure 10:
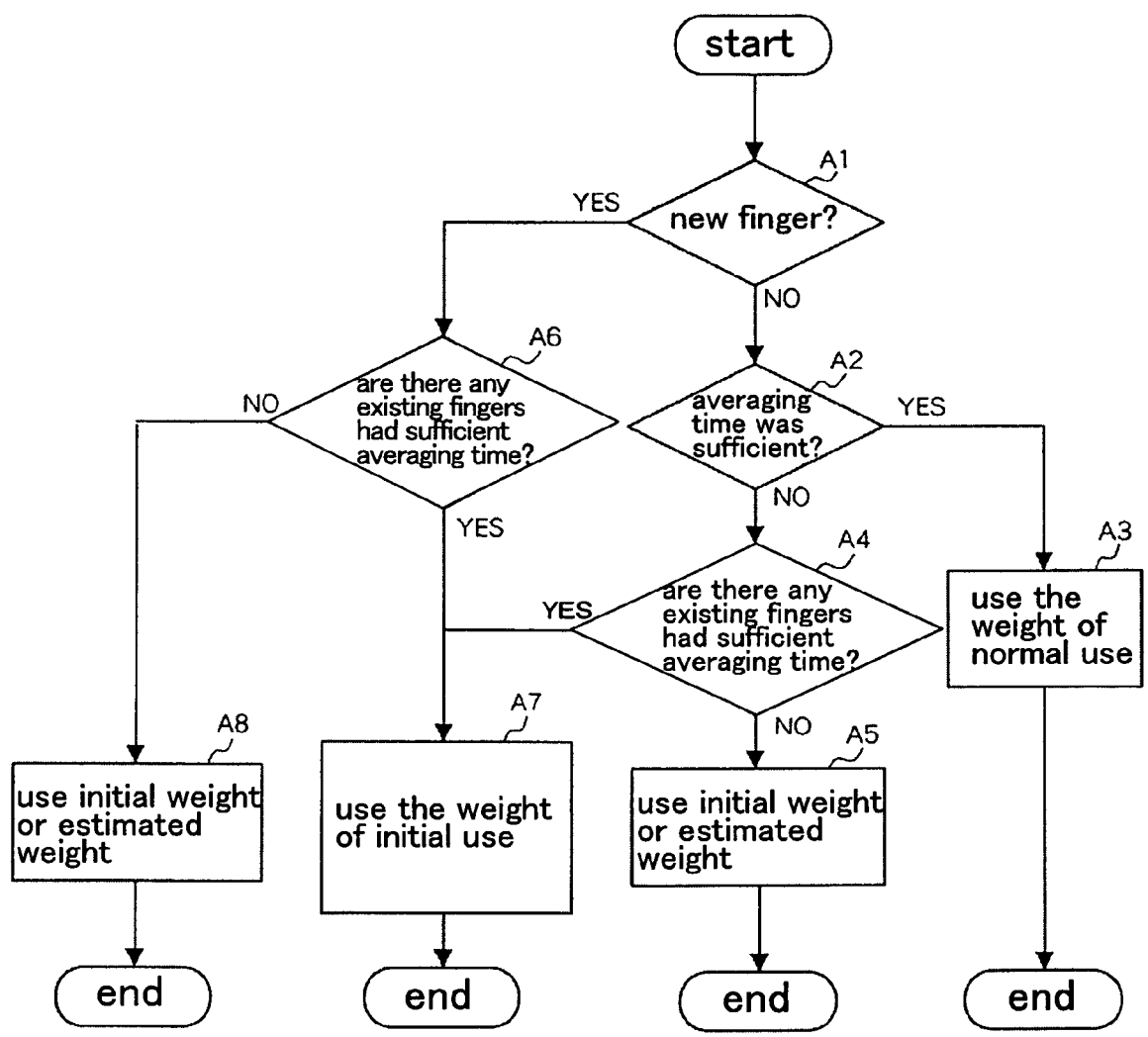
FIG. 10 is a flow chart showing operations when assigning fingers in an adaptive antenna reception device according to the present embodiment.

FIG. 10 is a flow chart showing the operations when fingers are assigned in an adaptive antenna reception device according to the present embodiment. Referring to FIG. 10, information collection/selection processor 22 first determines whether the fingers that have been assigned to signal processors $2_1$-$2_L$ by searcher 16 are new or not (Step A1). If the fingers are new, information collection/selection processor 22 next determines whether there are fingers in which sufficient averaging time has been secured in signal common-mode average calculation units $13_1$-$13_L$ and time average calculation units $15_1$-$15_L$ of weight calculation units $6_1$-$6_L$ among the fingers that have already been assigned to signal processors $2_1$-$2_L$ (Step A6).

If there are no already existing fingers having sufficient averaging time, information collection/selection processor 22 reports this situation to initial weight generation units $9_1$-$9_L$ of signal processors $2_1$-$2_L$ to which new fingers have been assigned. Initial weight generation units $9_1$-$9_L$ that receive this report generate a second initial weight and send this weight to weighting/synthesizing circuits $5_1$-$5_L$. Weighting/synthesizing circuits $5_1$-$5_L$ that have received the second initial weight from initial weight generation units $9_1$-$9_L$ use this second initial weight to perform weighting/synthesizing (Step A8).

If at least one already existing finger is determined to have sufficient averaging time in the Step A6, information collection/selection processor 22 reports the beam number of the beam, that is in the direction closest to the signal arrival direction of the finger among these already existing fingers in which the highest SIR has been measured, to initial weight generation units $9_1$-$9_L$ of signal processors $2_1$-$2_L$ to which new fingers have been assigned. Initial weight generation units $9_1$-$9_L$ that have received this report select from the table the initial weight that corresponds to this beam number and send this initial weight to weighting/synthesizing circuits $5_1$-$5_L$. Weighting/synthesizing circuits $5_1$-$5_L$ that have received the initial weight from initial weight generation units $9_1$-$9_L$ use this initial weight to realize weight synthesis (Step A7).

If the fingers are determined not to be new in the Step A1, information collection/selection processor 22 determines whether sufficient averaging time has been secured in signal processors $2_1$-$2_L$ to which these fingers have been assigned (Step A2).

If the averaging time is not sufficient, information collection/selection processor 22 determines whether there are fingers among the fingers that have already been assigned to signal processors $2_1$-$2_L$ in which sufficient averaging time has been secured in signal common-mode average calculation units $13_1$-$13_L$ and in time average calculation units $15_1$-$15_L$ of weight calculation units $6_1$-$6_L$ (Step A4).

If at least one already existing finger has sufficient averaging time, the process advances to Step A7, and information collection/selection processor 22 reports the beam number of the beam in the direction that is closest to the signal arrival direction of the finger, among the already existing fingers in which the highest SIR has been measured, to initial weight generation units $9_1$-$9_L$ of signal processors $2_1$-$2_L$ to which new fingers have been assigned. Initial weight generation units $9_1$-$9_L$ that receive this report select the initial weight that corresponds to this beam number from the table and send this initial weight to weighting/synthesizing circuits $5_1$-$5_L$. Weighting/synthesizing circuits $5_1$-$5_L$ that receive this initial weight from initial weight generation units $9_1$-$9_L$ realize weighting/synthesizing using this initial weight.

If there are no already existing fingers in which sufficient averaging time has been secured in the Step A4, information collection/selection processor 22 reports this finding to initial weight generation units $9_1$-$9_L$ of signal processors $2_1$-$2_L$ that are the objects of finger assignment. Initial weight generation units $9_1$-$9_L$ that receive this report generate a second initial weight and send this second initial weight to weighting/synthesizing circuits $5_1$-$5_L$.

Weighting/synthesizing circuits $5_1$-$5_L$ that receive the second initial weight from initial weight generation units $9_1$-$9_L$ use this second initial weight to realize weighting/synthesizing (Step A5).

If sufficient averaging time is secured in the Step A2, weight calculation units $6_1$-$6_L$ of signal processors $2_1$-$2_L$ that are the objects of finger assignment send the calculated weight to weighting/synthesizing circuits $5_1$-$5_L$. Weighting/synthesizing circuits $5_1$-$5_L$ that receive weights from weight calculation units $6_1$-$6_L$ use these weights to realize weighting/synthesizing (Step A3).

Figure 11:
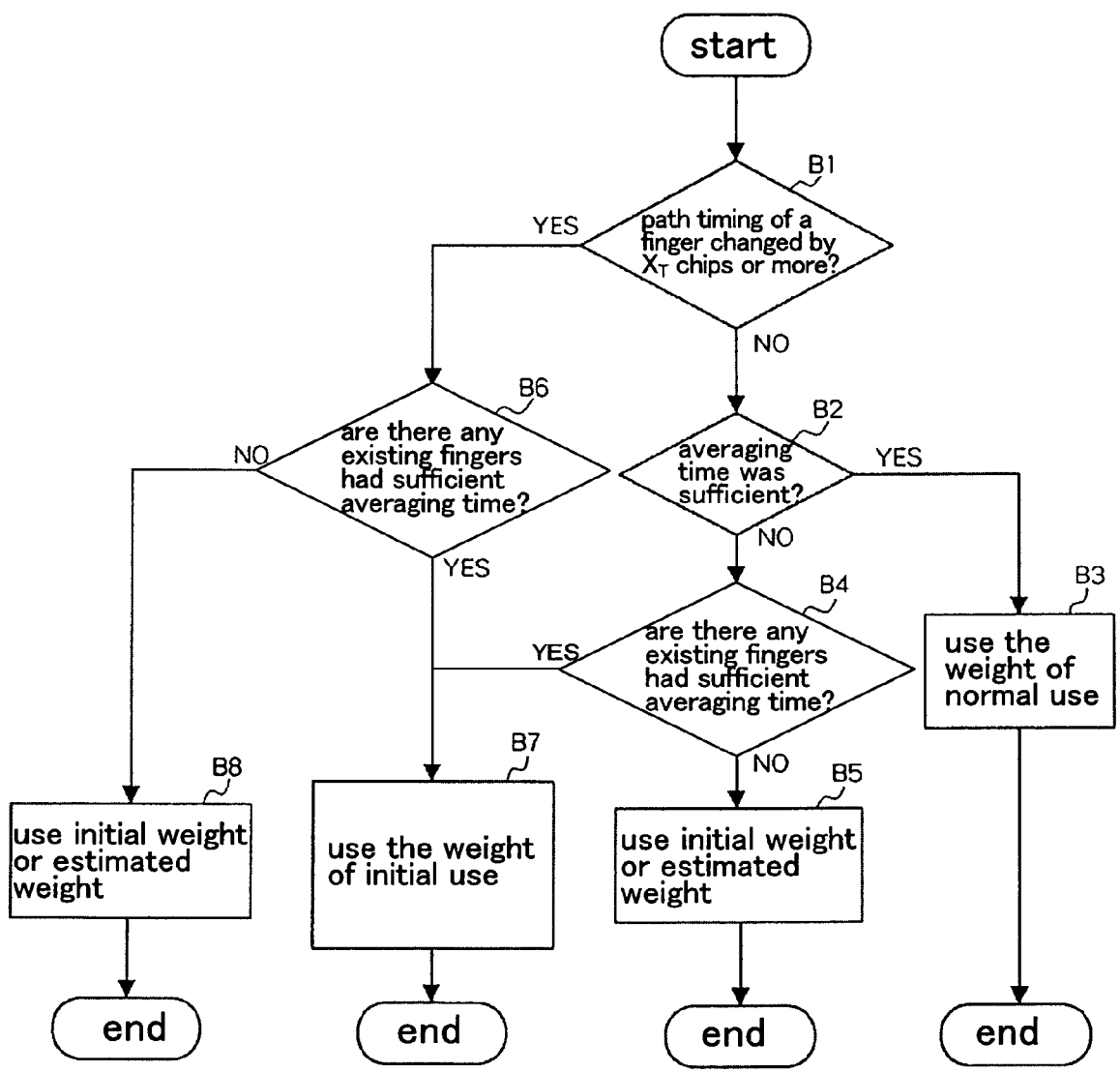
FIG. 11 is a flow chart showing the operations when the path timing of a finger has changed in the adaptive antenna reception device according to the present embodiment.

FIG. 11 is a flow chart showing operations when the path timing of fingers undergoes changes in the adaptive antenna reception device according to the present embodiment.

As shown in FIG. 11, in the event of a change of the path timing (delay time) of a finger that has been assigned by searcher 16 to any of signal processors $2_1$-$2_L$, information collection/selection processor 22 determines whether the path timing of this finger has changed by more than $x_T$ chips (Step B1). Here, $x_T$ chips is the threshold value for the amount of change of path timing and is used to determine whether the change in the path timing is at a level that cannot be followed by the weight that is calculated by weight calculation units $6_1$-$6_L$. When the change in path timing is greater than the threshold value, the weight from weight calculation units $6_1$-$6_L$ cannot be relied upon until sufficient averaging time is secured.

If the change in path timing is equal to or greater than $x_T$ chips, information collection/selection processor 22 next determines whether there are fingers among fingers that have already been assigned to signal processors $2_1$-$2_L$ in which sufficient averaging time has been secured in signal common-mode average calculation units $13_1$-$13_L$ and in time average calculation units $15_1$-$15_L$ of weight calculation units $6_1$-$6_L$ (Step B6).

If there are not any already existing fingers in which sufficient averaging time has been secured, information collection/selection processor 22 reports this finding to initial weight generation units $9_1$-$9_L$ of signal processors $2_1$-$2_L$ that are the objects of processing. Initial weight generation units $9_1$-$9_L$ that receive this report generate the second initial weight and send this second initial weight to weighting/synthesizing circuits $5_1$-$5_L$. Weighting/synthesizing circuits $5_1$-$5_L$ that receive the second initial weight from initial weight generation units $9_1$-$9_L$ use this second initial weight to realize weighting/synthesizing (Step B8).

If sufficient averaging time has been secured in at least one already existing finger in the Step B6, information collection/selection processor 22 reports the beam number of the beam in the direction closest to the signal arrival direction of the finger, among already existing fingers in which the highest SIR has been measured, to initial weight generation units $9_1$-$9_L$ of signal processors $2_1$-$2_L$ that are the objects of processing. Initial weight generation units $9_1$-$9_L$ that receive this report select the initial weight that corresponds to this beam number from the table and send this initial weight to weighting/synthesizing circuits $5_1$-$5_L$. Weighting/synthesizing circuits $5_1$-$5_L$ that have received the initial weight from initial weight generation units $9_1$-$9_L$ use this initial weight to realize weighting/synthesizing (Step B7).

If the change in path timing falls below $x_T$ chips in the Step B1, information collection/selection processor 22 determines whether sufficient averaging time has been secured in signal processors $2_1$-$2_L$ to which the fingers have been assigned (Step B2).

If the averaging time is not sufficient, information collection/selection processor 22 determines whether there are fingers among fingers that have already been assigned to signal processors $2_1$-$2_L$ in which sufficient averaging time has been secured in signal common-mode average calculation units $13_1$-$13_L$ and in time average calculation units $15_1$-$15_L$ of weight calculation units $6_1$-$6_L$ (Step B4).

If sufficient averaging time has been secured in at least one already existing finger, the process advances to Step B7, and information collection/selection processor 22 reports the beam number of the beam in the direction closest to the signal arrival direction of the finger, among the already existing fingers in which the highest SIR has been measured, to initial weight generation units $9_1$-$9_L$ of signal processors $2_1$-$2_L$ that are the objects of processing. Initial weight generation units $9_1$-$9_L$ that receive this report select the initial weight that corresponds to this beam number from the table and send this initial weight to weighting/synthesizing circuits $5_1$-$5_L$. Weighting/synthesizing circuits $5_1$-$5_L$ that receive the initial weight from initial weight generation units $9_1$-$9_L$ use this initial weight to realize weighting/synthesizing.

If there are no already existing fingers in which sufficient averaging time has been secured in the Step B4, information collection/selection processor 22 reports this finding to initial weight generation units $9_1$-$9_L$ of signal processors $2_1$-$2_L$ that are the object of processing. Initial weight generation units $9_1$-$9_L$ that receive this report generate a second initial weight and send this second initial weight to weighting/synthesizing circuits $5_1$-$5_L$. Weighting/synthesizing circuits $5_1$-$5_L$ that have received the second initial weight from initial weight generation units $9_1$-$9_L$ use the second initial weight to realize weighting/synthesizing (Step B5).

If sufficient averaging time has been obtained in the Step B2, weight calculation units $6_1$-$6_L$ of signal processors $2_1$-$2_L$ that are the objects of processing send the calculated weight to weighting/synthesizing circuits $5_1$-$5_L$. Weighting/synthesizing circuits $5_1$-$5_L$ that have received the weight from weight calculation units $6_1$-$6_L$ use this weight to realize weighting/synthesizing (Step B3).

As described in the foregoing explanation, in an adaptive antenna that forms beams for each finger according to the present embodiment, upon stabilization, accurate weights that have been calculated by weight calculation units $6_1$-$6_L$ are provided to weighting/synthesizing circuits $5_1$-$5_L$. However, when a finger is newly assigned, when the path timing of the finger that is being assigned undergoes a great change, or when sufficient accuracy has not been obtained for the weight that is calculated by weight calculation units $6_1$-$6_L$ of an already assigned finger, a beam is selected from a table that has a plurality of beams for which beam direction and weight have been determined in advance as orthogonal or equally spaced multi-beams. This selected beam is the closest to the signal arrival direction of the finger having the greatest SIR among other fingers for which sufficient averaging time has been secured and weight of sufficient accuracy has been calculated. By using the weight of this selected beam as the initial weight, a directional beam having high reception quality can be formed in a short time and with little calculation, and a deterioration of characteristics can be prevented. This approach also allows a reduction of the voluminous processing that is required when the transmission path is estimated and the weight that is obtained by this estimation is used as the initial weight.

The following explanation regards another embodiment of the present invention.

Figure 12:
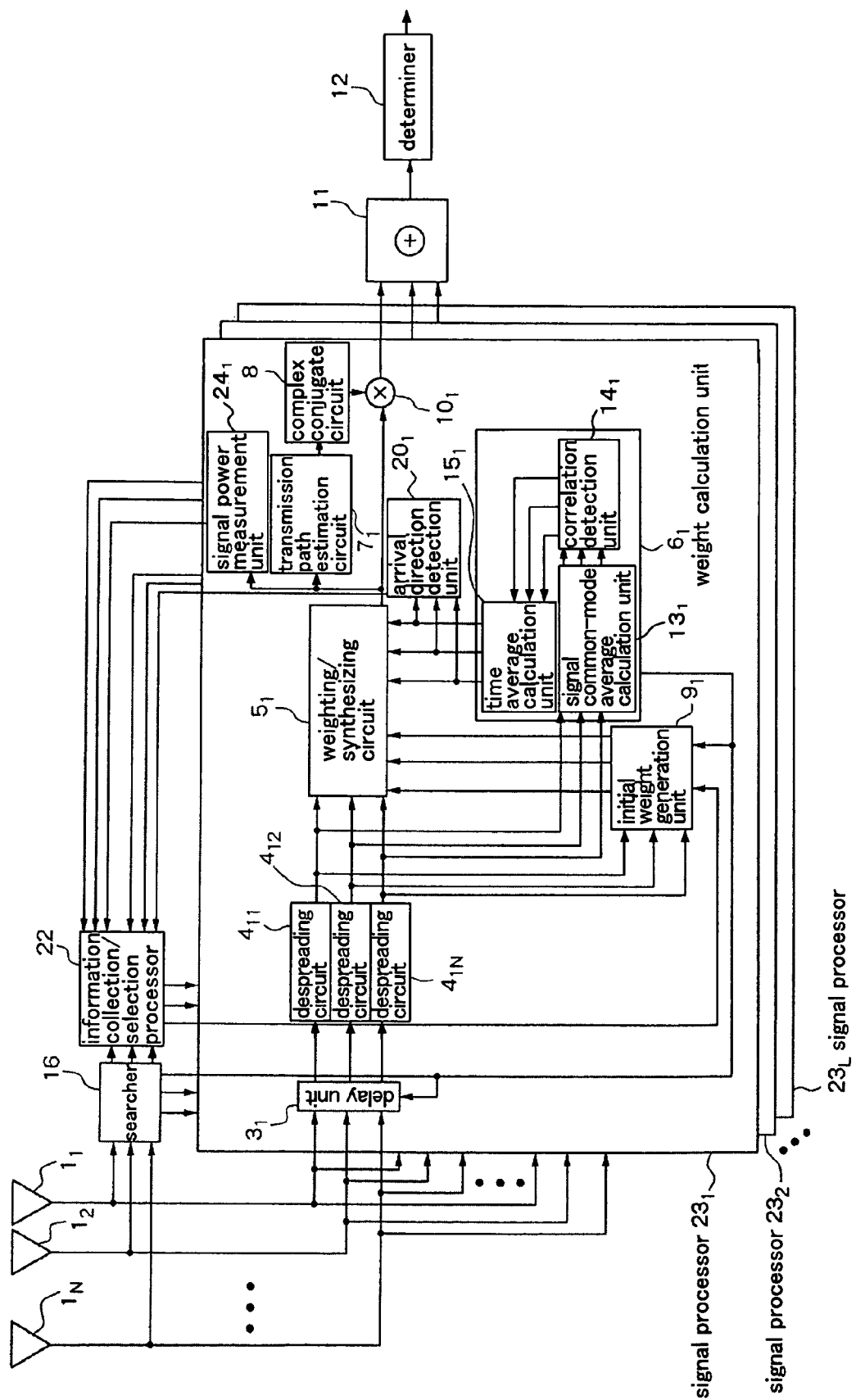
FIG. 12 is a block diagram showing an example of the configuration of an open-loop controlled adaptive antenna reception device according to another embodiment of the present invention.

FIG. 12 is a block diagram showing an example of the configuration of the open-loop controlled adaptive antenna reception device according to another embodiment of the present invention. As with the device that is shown in FIG. 5, in the adaptive antenna reception device that is shown in FIG. 12, N is the number of antennas that make up the adaptive antenna (where N is an integer equal to or greater than 2) and L is the number of multi-paths that are synthesized (where L is a natural number). In addition, the figure shows the circuit portion that receives the user signal from the mobile station of the $k^{th}$ user (where k is a natural number).

Referring to FIG. 12, the adaptive antenna reception device includes: antennas $1_1$-$1_N$, signal processors $23_1$-$23_L$, adder 11, determiner 12, searcher 16, and information collection/selection processor 22.

Signal processor $23_1$ includes: delay unit $3_1$, despreading circuits $4_{11}$-$4_{1N}$, weighting/synthesizing circuit $5_1$, weight calculation unit $6_1$, transmission path estimation circuit $7_1$, complex conjugate circuit $8_1$, initial weight generation unit $9_1$, multiplier $10_1$, arrival direction detection unit $20_1$, and signal power measurement unit $24_1$. In addition, weight calculation unit $6_1$ includes: signal common-mode average calculation unit $13_1$, correlation detection unit $14_1$, and time average calculation unit $15_1$.

Although not shown in the figure, the interiors of signal processors $23_2$-$23_L$ have the same configuration as signal processor $23_1$. For example, signal processor $23_2$ includes: delay unit $3_2$, despreading circuits $4_{21}$-$4_{2N}$, weighting/synthesizing circuit $5_2$, weight calculation unit $6_2$, transmission path estimation circuit $7_2$, complex conjugate circuit $8_2$, initial weight generation unit $9_2$, multiplier $10_2$, arrival direction detection unit $20_2$, and signal power measurement unit $24_2$. In addition, weight calculation unit $6_2$ includes: signal common-mode average calculation unit $13_2$, correlation detection unit $14_2$, and time average calculation unit $15_2$.

Antennas $1_1$-$1_N$, adder 11, determiner 12, searcher 16, information collection/selection processor 22, delay unit $3_1$, despreading circuits $4_{11}$-$4_{1N}$, weighting/synthesizing circuit $5_1$, weight calculation unit $6_1$, transmission path estimation circuit $7_1$, complex conjugate circuit $8_1$, initial weight generation unit $9_1$, multiplier $10_1$, and arrival direction detection unit $20_1$ are all identical to the elements shown in FIG. 5. The two configurations differ in that SIR measurement units $21_1$-$21_L$ in FIG. 5 are replaced by signal power measurement units $24_1$-$24_L$ in FIG. 12.

Signal power measurement units $24_1$-$24_L$ measure any time averaged signal power based on the output of weighting/synthesizing circuits $5_1$-$5_L$ and sends the result to information collection/selection processor 22. When sufficient accuracy has not been obtained in the weights that are calculated by weight calculation units $6_1$-$6_L$, information collection/selection processor 22 reports the beam number that is used in generating initial weights to initial weight generation units $9_1$-$9_L$ of these signal processors $23_1$-$23_L$. In the present embodiment, the beam number that is reported at this time is the beam number of the direction that is closest to the arrival direction of the signal in, among fingers that have already been assigned to any of signal processors $23_1$-$23_L$, the finger in which sufficient averaging time has been secured in signal common-mode average calculation units $13_1$-$13_L$ and time average calculation units $15_1$-$15_L$ of weight calculation units $6_1$-$6_L$ and in which the greatest signal power has been measured in signal power measurement units $24_1$-$24_L$. A plurality of beam numbers have been determined in advance using multi-beams that are orthogonal or equally spaced with respect to the arrival direction of the signal, as shown in FIGS. 7 and 8.

In the present embodiment, attention is focused on the high probability that the received signal of a path having high signal power will have excellent characteristics. Accordingly, the beam that is selected is the beam closest to the signal arrival direction of, among fingers in which sufficient averaging time has been secured and weights of sufficient accuracy have been calculated, the finger in which the received signal power is a maximum. As a result, as with the device that is shown in FIG. 5, a directional beam having high reception quality can be formed in a short time and with few operations and degradation of characteristics can be prevented. In addition, the present embodiment can reduce the large amount of processing that is required when transmission path estimation is carried out and the thus-obtained weight is used as the initial weight.

The following explanation regards yet another embodiment of the present invention.

Figure 13:
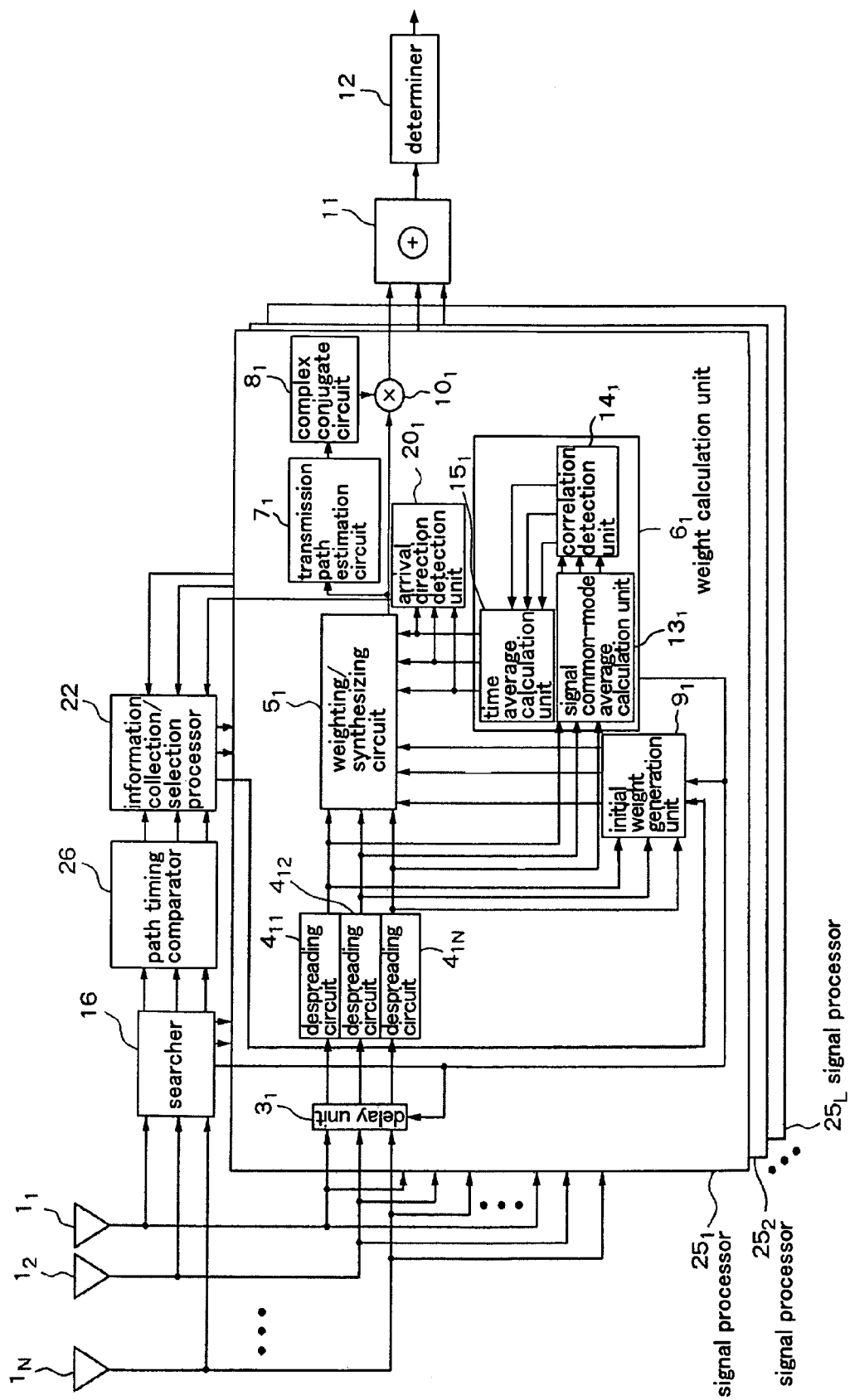
FIG. 13 is a block diagram showing an example of the configuration of an open-loop controlled adaptive antenna reception device according to yet another embodiment of the present invention.

FIG. 13 is a block diagram showing an example of the configuration of an open-loop controlled adaptive antenna reception device according to yet another embodiment of the present invention. As with the devices that are shown in FIG. 5 and FIG. 12, in the adaptive antenna reception device that is shown in FIG. 13, N is the number of antennas that make up the adaptive antenna (where N is an integer that is equal to or greater than 2), and L is the number of synthesized multipaths (where L is a natural number). The figure shows the circuit portions for receiving the user signal that is received from the mobile station of the $k^{th}$ user (where k is a natural number).

Referring to FIG. 13, the adaptive antenna reception device includes: antennas $1_1$-$1_N$, signal processors $25_1$-$25_L$, adder 11, determiner 12, searcher 16, path timing comparator 26, and information collection/selection processor 22.

Signal processor $25_1$ includes: delay unit $3_1$, despreading circuits $4_{11}$-$4_{1N}$, weighting/synthesizing circuit $5_1$, weight calculation unit $6_1$, transmission path estimation circuit $7_1$ complex conjugate circuit $8_1$, initial weight generation unit $9_1$, multiplier $10_1$, and arrival direction detection unit $20_1$. In addition, weight calculation unit $6_1$ includes signal common-mode average calculation unit $13_1$, correlation detection unit $14_1$, and time average calculation unit $15_1$.

Although not shown in the figure, the interiors of signal processors $25_2$-$25_L$ have the same configuration as signal processor $25_1$.

Antennas $1_1$-$1_N$, adder 11, determiner 12, searcher 16, information collection/selection processor 22, delay unit $3_1$, despreading circuits $4_{11}$-$4_{1N}$, weighting/synthesizing circuit $5_1$, weight calculation unit $6_1$, transmission path estimation circuit $7_1$, complex conjugate circuit $8_1$, initial weight generation unit $9_1$, multiplier $10_1$, and arrival direction detection unit $20_1$ are identical to the elements shown in FIG. 5.

The adaptive antenna reception device of the present embodiment shown in FIG. 13 lacks SIR measurement units $21_1$-$21_L$ that are shown in FIG. 5 but includes path timing comparator 26.

Based on the timing information from searcher 16, path timing comparator 26 reports the finger having the shortest delay time to information collection/selection processor 22.

Information collection/selection processor 22 reports the beam number that is used in generating the initial weights to initial weight generation units $9_1$-$9_L$ of signal processors $25_1$-$25_L$ when sufficient accuracy is not obtained in the weights that are calculated in weight calculation units $6_1$-$6_L$. In the present embodiment, the beam number that is reported at this time is the beam number of the direction that is closest to the arrival direction of the signal in, among the fingers that have already been assigned to any of signal processors $25_1$-$25_L$, the finger in which the delay time is shortest and in which sufficient averaging time has been secured in signal common-mode average calculation units $13_1$-$13_L$ and time average calculation units $15_1$-$15_L$ in weight calculation units $6_1$-$6_L$. In this case, a plurality of beam numbers have been determined in advance using multi-beams that are orthogonal or equally spaced with respect to the arrival direction of the signal, as shown in FIGS. 7 and 8.

In the present embodiment, attentions focuses on the high probability that the signal that is received on the path having the shortest delay time is a direct wave having a high reception level and superior reception characteristics. Accordingly, a beam is selected that is closest to the signal arrival direction of, among fingers in which sufficient averaging time has been secured and in which weights have been calculated with sufficient accuracy, the finger that has the shortest delay time. As a result, as with the device that is shown in FIG. 5, a directional beam having high reception quality can be formed in a short time and with little calculation, and degradation of characteristics can be prevented. In addition, the present embodiment allows a reduction of the large amount of processing that was required when carrying out a transmission path estimation and using the thus-obtained weight as the initial weight.

In addition, although the signal arrival direction of the finger having the shortest delay time was used in the present embodiment, as another example, the signal arrival direction of the finger in which the continuous time of the path is longest may also be used. The continuous time of the path is the time during which an incoming wave is continuously received without being interrupted by signal processors $25_1$-$25_L$. In this case, attention is given to the high probability that the signal that is received by the path having the longest continuous time is the most stable direct wave.

All of the embodiments that have been described thus far involved examples of devices that were used in CDMA communication, but the present invention is not limited to this CDMA form. As an example, the present invention can also be applied to devices that are used in TDMA (Time Division Multiple Access) or FDMA (Frequency Division Multiple Access) communication.

In addition, examples have been presented in all of the embodiments described thus far in which a method was used in weight calculation units $6_1$-$6_L$ for simply estimating the arrival direction of a desired wave, but the present invention is not limited to algorithms that are used in weight calculation units $6_1$-$6_L$. For example, an arrival direction estimation algorithm realized by a MUSIC algorithm or ESPRIT algorithm may also be used.

The invention claimed is:

1. An adaptive antenna reception method wherein a signal processor is assigned to at least one incoming wave, and in said signal processor, signals that are received by a plurality of antennas are weighted by weights of each of said antennas that are determined by using a time average of a calculated value that is obtained by a prescribed computation from received signals of said plurality of antennas and then synthesized to further synthesize a plurality of incoming waves that are received in a plurality of signal processors to obtain a desired signal; said adaptive antenna reception method comprising steps of:

a first step for detecting the arrival direction of an incoming wave that is received by signal processors from weights that are determined by each signal processor in which at least a prescribed time interval has been secured for an averaging time to find a time average;

a second step for finding the reception quality of the signal of an incoming wave that is received by weighting and synthesizing by each of said signal processors in which at least said prescribed time interval has been secured for the averaging time; and a third step for selecting an initial beam direction in said signal processors that are to begin determination of weights using time averages, based on each arrival direction and the reception quality in each of said signal processors in which at least said prescribed time interval has been secured for the averaging time, the initial beam direction being selected from among a plurality of predetermined beam directions based on reception quality.

2. The adaptive antenna reception method according to claim 1, wherein, in said third step, the beam direction that is closest to the arrival direction that has been detected in, among each of said signal processors in which at least said prescribed time interval has been secured for said averaging time, the signal processor in which the best reception quality has been obtained is selected from among the plurality of predetermined beam directions.

3. The adaptive antenna reception method according to claim 2, wherein, in said second step, the ratio of the signal power of a desired wave to the signal power of interference waves is measured as said reception quality.

4. The adaptive antenna reception method according to claim 2, wherein, in said second step, signal power is measured as said reception quality.

5. The adaptive antenna reception method according to claim 2, wherein, in said second step, delay time is used as said reception quality.

6. The adaptive antenna reception method according to claim 2, wherein, in said second step, the continuous time of a path is used as said reception quality.

7. The adaptive antenna reception method according to claim 1, wherein, in said second step, the ratio of the signal power of a desired wave to the signal power of interference waves is measured as said reception quality.

8. The adaptive antenna reception method according to claim 1, wherein, in said second step, signal power is measured as said reception quality.

9. The adaptive antenna reception method according to claim 1, wherein, in said second step, delay time is used as said reception quality.

10. The adaptive antenna reception method according to claim 1, wherein, in said second step, the continuous time of a path is used as said reception quality.

11. The adaptive antenna reception method according to claim 1, further comprising a fourth step for finding an initial weight to form a directional beam in an initial beam direction that is selected in said third stop, and using this initial weight in weighting and synthesizing until at least a prescribed time interval has been secured for averaging time in said signal processors.

12. An adaptive antenna reception device, in which a signal processor is assigned to at least one incoming wave, and in said signal processor, signals that are received by a plurality of antennas are weighted by weights of each of said antennas that are determined by using a time average of a calculated value that is obtained by a prescribed computation from received signals of said plurality of antennas and then synthesized to further synthesize a plurality of incoming waves that have been received in a plurality of signal processors to obtain a desired signal; said adaptive antenna reception device comprising:

an arrival direction detection unit for detecting the arrival direction of an incoming wave that is received by the signal processors from weights that have been determined by each signal processor in which at least a prescribed time interval has been secured for an averaging time to find a time average;

a reception quality acquisition unit for finding reception quality of a signal of an incoming wave that is received by weighting and synthesizing by each of said signal processors in which at least said prescribed time interval has been secured for the averaging time; and an information collection/selection processor for selecting an initial beam direction in said signal processors that are to begin determination of weights that uses time average, based on each arrival direction and the reception quality in each of said signal processors in which at least said prescribed time interval has been secured for the averaging time, the initial beam direction being selected from among a plurality of predetermined beam directions based on reception quality.

13. The adaptive antenna reception device according to claim 12, wherein said information collection/selection processor selects, from among the plurality of predetermined beam directions, the beam direction that is closest to an arrival direction that has been detected by, among each of said signal processors in which at least said prescribed time interval has been secured for said averaging time, the signal processor in which the best reception quality has been obtained.

14. The adaptive antenna reception device according to claim 13, wherein said reception quality acquisition unit measures the ratio of the signal power of a desired wave to the signal power of interference waves as said reception quality.

15. The adaptive antenna reception device according to claim 13, wherein said reception quality acquisition unit measures signal power as said reception quality.

16. The adaptive antenna reception device according to claim 13, wherein said reception quality acquisition unit uses delay time as said reception quality.

17. The adaptive antenna reception device according to claim 13, wherein said reception quality acquisition unit uses continuous time of a path as said reception quality.

18. The adaptive antenna reception device according to claim 12, wherein said reception quality acquisition unit measures the ratio of the signal power of a desired wave to the signal power of interference waves as said reception quality.

19. The adaptive antenna reception device according to claim 12, wherein said reception quality acquisition unit measures signal power as said reception quality.

20. The adaptive antenna reception device according to claim 12, wherein said reception quality acquisition unit uses delay time as said reception quality.

21. The adaptive antenna reception device according to claim 12, wherein said reception quality acquisition unit uses continuous time of a path as said reception quality.

22. The adaptive antenna reception device according to claim 12, further comprising an initial weight generation unit for forming a directional beam in an initial beam direction that has been selected by said information collection/selection processor and for finding an initial weight that is used in weighting and synthesizing until at least said prescribed time interval has been secured for averaging time in said signal processors.

* * * * *